3,010,996
ARYLOXY ACETIC ACID AMIDES

Franz Litvan and Willy G. Stoll, Basel, Switzerland, assignors to Geigy Chemical Corporation, Ardsley, N.Y., a corporation of Delaware
No Drawing. Filed July 13, 1959, Ser. No. 826,403
Claims priority, application Switzerland July 30, 1958
8 Claims. (Cl. 260—559)

The present invention is concerned with new aryloxy acetic acid amides which have valuable pharmacological properties and with processes for the production thereof.

It has been found that substituted aryloxy acetic acid amides corresponding to the general formula

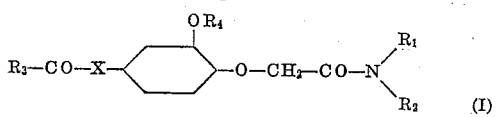

(I)

wherein $R_1$ represents an alkyl, alkenyl or cycloalkyl radical or a phenyl or benzyl radical possibly substituted by halogen atoms or low molecular alkyl or alkoxy groups,
$R_2$ represents hydrogen or a low molecular alkyl or alkenyl radical,
$R_3$ represents an alkyl radical,
$R_4$ represents a low molecular alkyl radical, and X represents the direct linkage or an ethylene or vinylene group —$CH_2$—$CH_2$— or —$CH$=$CH$—, respectively, and alkyl radicals $R_1$ and $R_2$ can also be bound to each other direct or by way of an oxygen atom, have pharmacologically valuable properties, in particular hypnotic and anaesthetic activity.

The compounds defined above can be produced by reacting in the presence of an acid binding agent, a halogen acetamide of the general formula

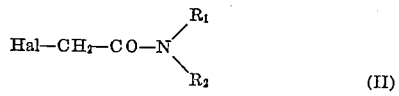

(II)

wherein Hal represents a halogen atom and $R_1$ and $R_2$ have the meanings given above, with a substituted phenol of the general formula

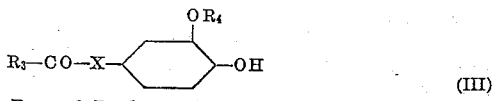

(III)

wherein $R_3$ and $R_4$ have the meanings given above, or by reacting a halogen acetamide of the general formula II with a salt of such a phenol, in particular with an alkali metal salt. Amides suitable for the reaction are, for example, chloroacetic acid and bromoacetic acid methylamide, ethylamide, n-propylamide, isopropylamide, n-butylamide, isobutylamide, sec. butylamide, n-amylamide, isoamylamide, n-hexylamide, allylamide, methallylamide, cyclopentylamide, cyclohexylamide, cycloheptylamide, anilide, o-toluidide, m-toluidide, p-toluidide, benzylamide, dimethylamide, N-methyl-ethylamide, diethylamide, N-methyl-n-propylamide, N-methyl-isopropylamide, di-n-propylamide, N-methyl-n-butylamide, N-methyl-isobutylamide, di-isobutylamide, N-methyl-allylamide, N-ethyl-allylamide, diallylamide, N-methyl-methallylamide, dimethallylamide, N-methyl-cyclohexylamide, N-methyl-benzylamide, dibenzylamide, pyrrolidide, piperidide, 2-methyl-piperidide, morpholide; as well as N-alkyl- or N-alkenyl- arylamides such as chloroacetic acid and bromoacetic acid N-methyl-, N-ethyl-, N-n-propyl-, N-isopropyl-, N-n-butyl-, N-isobutyl-, N-sec. butyl-, N-n-amyl-, N-isoamyl-, N-n-hexyl-, N-allyl-, N-crotyl- and N-methallylanilide, o-toluidide, m-toluidide, p-toluidide, 3.4-dimethyl anilide, 2.4-dimethyl anilide, 2.5-dimethyl anilide, 2.6-dimethyl anilide, mesidide, 4-ethyl anilide, 4-tert. butyl anilide, 2-chloranilide, 3-chloranilide, 4-chloranilide, 2.5-dichloranilide, 4-bromanilide, o-anisidide, m-anisidide, p-anisidide, and p-phenetidide. Examples of phenols of the general formula III which can be used according to the invention are 2-methoxy-4-acetyl phenol (acetovanillon),
2-methoxy-4-propionyl phenol,
2-methoxy-4-n-butyryl phenol,
2-methoxy-4-isobutyryl phenol,
2-methoxy-4-valeryl phenol,
2-methoxy-4-isovaleryl phenol,
2-methoxy-4-(butane-3′-onyl)-phenol,
2-methoxy-4-($\Delta^{1',2'}$-butene-3′-onyl)-phenol,
2-methoxy-4-($\Delta^{1',2'}$-pentene-3′-onyl)-phenol,
2-methoxy-4-(2′-methyl-$\Delta^{1',2'}$-butene-3′-onyl)-phenol,
2-methoxy-4-(2′-methyl-$\Delta^{1',2'}$-pentene-3′-onyl)-phenol,
2-ethoxy-4-acetyl phenol, 2-ethoxy-4-propionyl phenol,
2-ethoxy-4-n-butyryl phenol and
2-ethoxy-4-isovaleryl phenol.

The compounds of the general Formula I defined above can also be produced by reacting an aryloxy acetic acid of the general formula.

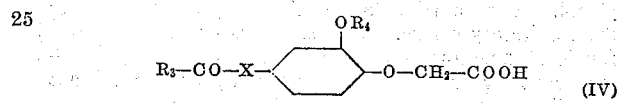

(IV)

wherein $R_3$, $R_4$ and X have the meanings given above, or a reactive functional derivative thereof, with a primary or secondary amine of the general formula

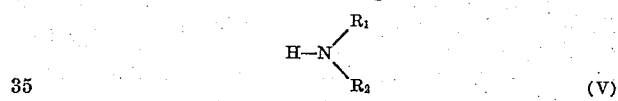

(V)

wherein $R_1$ and $R_2$ have the meanings given above.

Suitable reactive functional derivatives of aryloxy acetic acids of the general Formula IV are, for example, the halides thereof and mixed anhydrides with low aliphatic carboxylic acids, in particular with acetic acid, as well as the esters thereof, in particular the low alkyl esters and the phenyl ester.

The reactions are performed advantageously in solvents or diluents. For the reactions with acid halides and anhydrides, on the one hand inert organic solvents such as ether or benzene hydrocarbons and on the other, water, can be used. Also alcohols can be used for the reactions with acid esters. In the reactions with acid halides or mixed anhydrides in organic solvents, an excess of the amine used for the reaction or also a tertiary organic base such as pyridine or dimethyl aniline can be used as acid binding agent; when the reaction is performed in water, also inorganic substances such as sodium or potassium carbonate can be used.

Examples of aryloxy acetic acids according to the invention of the general Formula IV which are used as components of compounds of the general Formula I are:

2-methoxy-4-acetyl-phenoxy acetic acid,
2-methoxy-4-propionyl-phenoxy acetic acid,
2-methoxy-4-n-butyryl-phenoxy acetic acid,
2-methoxy-4-isobutyryl-phenoxy acetic acid,
2-methoxy-4-isovaleryl-phenoxy acetic acid,
2-methoxy-4-(butane-3′-onyl)-phenoxy acetic acid,
2-methoxy-4-($\Delta^{1'2'}$-pentene-3′-onyl)-phenoxy acetic acid,
2-methoxy-4-($\Delta^{1',2'}$-butene-3′-onyl)-phenoxy acetic acid,
2-ethoxy-4-acetyl-phenoxy acetic acid,
2-ethoxy-4-propionyl-phenoxy acetic acid,
2-ethoxy-4-n-butyryl-phenoxy acetic acid and
2-ethoxy-4-isovaleryl-phenoxy acetic acid.

These acids, advantageously however their functional derivatives, can be reacted for example with methyl-amine, ethylamine, allylamine, benzylamine, aniline, dimethylamine, diethylamine, N-methylbenzylamine, N-ethyl aniline, N-n-butyl aniline or with the other primary and secondary amines the chloracetyl and bromacetyl derivatives of which have been mentioned above.

A modification of the production process defined above which is suitable for the production of N.N-disubstituted amides, consists in reacting a carbaminyl chloride of the general formula

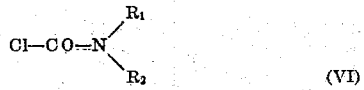

wherein $R_1$ has the meaning given above, and $R_2$ has the meaning given above for $R_2$ with the exception of hydrogen, with a salt of an aryloxy acetic acid of the general formula IV, in particular with an alkali metal salt, the reaction being performed in the warm. The N.N-disubstituted amides desired are formed whilst the corresponding chlorides, e.g. alkali metal chlorides are separated and carbon dioxide is developed. The carbaminyl chlorides derived from the secondary amines of the general formula V mentioned above are used, for example as starting materials of the general Formula VI.

The compounds according to the present invention produce general anaesthesia when administered by intravenous injection, e.g. dissolved in aqueous propylene glycol. A great advantage is that they do not depress the respiratory centre. Such solutions can also be used for local anaesthesia and regional anaesthesia by subcutaneous or intramuscular injections, or for surface anaesthesia by instillation. In addition, the compounds according to the present invention can be used as hypnotics on personal administration.

Of particular value are compounds of the general Formula I, wherein $R_1$ represents a lower alkyl, allyl, cyclohexyl, phenyl, methylphenyl, methoxyphenyl, benzyl or chlorobenzyl radical, $R_2$ represents hydrogen, a lower alkyl or allyl radical, $R_1$ and $R_2$ taken jointly with the nitrogen atom represent a piperidino or morpholino radical, $R_3$ represents an alkyl radical having at most seven carbon atoms, $R_4$ represents a methyl radical and X represents the direct linkage or the ethylene or vinylene radical.

The following examples further illustrate the production of the new compounds. Parts are given therein as parts by weight and their relationship to parts by volume is as that of grammes to cubic centimetres. The temperatures are in degrees centigrade.

*Example 1*

16.6 parts of acetovanillon (2-methoxy-4-acetyl phenol) are dissolved in an alcoholic sodium hydroxide solution prepared from 4 parts of sodium hydroxide, 5 parts of water and 100 parts by volume of ethanol, and the solution is refluxed. 17 parts of chloroacetic acid-N.N-diethylamide are added dropwise into the boiling solution and, on completion of the dropwise addition, the whole is refluxed for 5–6 hours. As much ethanol as possible is distilled off. Water is added to the cooled residue and the organic substance is taken up in benzene. The benzene solution is repeatedly washed with diluted caustic soda lye and then with water and dried over sodium sulphate, filtered and evaporated in a water bath. The solidified residue is purified by crystallisation from a mixture of benzene/benzine whereupon 2-methoxy-4-acetyl-phenoxy acetic acid-N.N-diethylamide is obtained. It melts at 97–98°.

In an analogous manner, starting from 18 parts of 2-methoxy-4-propionyl phenol, 2-methoxy-4-propionyl-phenoxy acetic acid-N.N-diethylamide is obtained, M.P. 92–93° (from n-hexane);

Starting from 19.4 parts of 2-methoxy-4-butyryl phenol, 2-methoxy-4-butyryl-phenoxy acetic acid-N.N-diethylamide is obtained, M.P. 68–70° (from n-heptane);

Starting from 20.8 parts of 2-methoxy-4-valeryl phenol, 2-methoxy-4-valeryl-phenoxy acetic acid-N.N-diethylamide is obtained, M.P. 77–78° (from benzine);

Starting from 22.2 parts of 2-methoxy-4-caproyl phenol, 2-methoxy-4-caproyl-phenoxy acetic acid-N.N-diethylamide is obtained, M.P. 88–89° (from n-heptane);

Starting from 23.6 parts of 2-methoxy-4-oenanthyl phenol, 2-methoxy-4-oenanthyl-phenoxy acetic acid-N.N-diethylamide is obtained, M.P. 70–73° (from n-heptane);

Starting from 19.4 parts of 2-ethoxy-4-propionyl phenol, 2-ethoxy-4-propionyl-phenoxy acetic acid-N.N-diethylamide is obtained, M.P. 80.5° (from benzene/benzine); and Starting from 25 parts of 2-methoxy-4-caprylyl phenol, 2-methoxy-4-caprylyl-phenoxy acetic acid-N.N-diethylamide is obtained, M.P. 72–74°.

*Example 2*

17 parts of 2-methoxy-4-acetyl phenol are dissolved in a solution of 6 parts of potassium hydroxide, 10 parts of water and 100 parts by volume of ethanol and the solution is brought to the boil. 20 parts of chloroacetic acid-N.N-diallylamide in 50 parts of ethanol are added dropwise to the boiling solution and, on completion of the dropwise addition, the whole is refluxed for another 5–6 hours. As much ethanol as possible is then distilled off, water is added to the cooled residue and the organic substance is taken up in benzene. The benzene solution is again washed with diluted sodium hydroxide solution and then with water, dried over sodium sulphate, filtered and concentrated on a water bath. 2-methoxy-4-acetyl-phenoxy acetic acid-N.N-diallylamide is obtained as a yellowish oil which boils at 200–203° under 0.15 mm. Hg. After crystallising from a mixture of benzene/benzine, it melts at 61.5°.

On using 23 parts of chloroacetic acid-N.N-di-n-butylamide instead of the chloroacetic acid diallylamide, 2-methoxy-4-acetyl phenoxy acetic acid-N.N-di-n-butylamide is obtained in an analogous manner. It is an oil which boils at 198–199° under 0.15 mm. Hg pressure.

Starting from 19 parts of chloroacetic acid-N-methyl-cyclohexylamide, 2-methoxy-4-acetyl-phenoxy acetic acid-N-methyl-N-cyclohexylamide is obtained. It is an oil which boils at 222–224° under 0.25 mm. Hg pressure and, after crystallising from benzene/benzine, it melts at 99–99.5°.

Starting from 17 parts of chloroacetic acid-piperidide, 2-methoxy-4-acetyl-phenoxy acetic acid-piperidide is obtained. It melts at 116° after crystallisation from alcohol/water.

Starting from 15 parts of chloroacetic acid pyrrolidide, 2-methoxy-4-acetyl-phenoxy acetic acid pyrrolidide is obtained.

Starting from 17 parts of chloroacetic acid morpholide, 2-methoxy-4-acetyl phenoxy acetic acid morpholide is obtained. It boils at 210–212° under 0.15 mm. Hg pressure and melts at 114–115° after crystallisation from benzene/petroleum ether.

*Example 3*

22 parts of 2-methoxy-4-n-caproyl phenol are dissolved in an alcoholic potassium hydroxide solution produced from 5.6 parts of potassium hydroxide, 10 parts of water and 150 parts of alcohol. The solution is then refluxed. A solution of 18.5 parts of chloroacetic acid-p-toluidide in as little alcohol as possible is added dropwise and the whole is boiled for another 13 hours. The alcohol is then distilled off, water is added to the residue which is taken up in ether and the ethereal solution is washed with diluted caustic soda lye and water. It is dried over sodium sulphate and the solvent is distilled off. 2-methoxy-4-n-caproyl phenoxy acetic acid-p-toluidide is obtained. Crystallised from ether/petroleum ether, it forms white crystals which melt at 115°.

If, instead of the chloroacetic acid-p-toluidide, 20 parts of chloroacetic acid-p-anisidide are used and otherwise the same procedure is followed, then 2-methoxy-4-n- caproyl phenoxy acetic acid-p-anisidide is obtained which, crystallised from acetone, forms white crystals which melt at 122°.

Again, in the above example, if 18.5 parts of chloroacetic acid-N-methyl anilide are used instead of chloroacetic acid-p-toluidide, 2-methoxy-4-n-caproyl phenoxy acetic acid-N-methyl anilide is obtained which can be crystallised from acetone, M.P. 100°.

If in the same process, 18.5 parts of chloroacetic acid-N-benzylamide are used, then after crystallisation from alcohol, 2-methoxy-4-n-caproyl phenoxy acetic acid-N-benzylamide is obtained which melts at 116°.

On using 25 parts of chlorophenoxy acetic acid-N-ethyl-N-p-chlorobenzylamide, 2-methoxy-4-n-caproyl phenoxy acetic acid-N-ethyl-N-p-chlorobenzylamide is obtained in the same way as a viscous yellowish oil B.P.$_{0.003}$ 208–212°.

*Example 4*

19.2 parts of vanillylidene acetone, [2-methoxy-4-($\Delta^{1'.2'}$-butene-3'-onyl)-phenol], are dissolved in an alcoholic sodium hydroxide solution prepared from 4 parts of sodium hydroxide, 5 parts of water and 100 parts by volume of ethanol, and then 17 parts of chloroacetic acid-N.N-diethylamide are added dropwise to the solution which is boiling under reflux. The whole is then refluxed for another 5 hours. The solvent is distilled off, water is added to the residue and the organic substance is taken up in benzene. After washing with diluted sodium hydroxide solution and water and drying over sodium sulphate, the benzene solution is evaporated on the water bath and the residue is recrystallised from a mixture of benzene/petroleum ether. 2-methoxy-4-($\Delta^{1'.2'}$-butene-3'-onyl)-phenoxy acetic acid-N.N-diethylamide is obtained which melts at 90–92°.

On using 19.4 parts of 2-methoxy-4-(butane-3'-onyl)-phenol, 2-methoxy-4-(butane - 3' - onyl) - phenoxy acetic acid-N.N-diethylamide is obtained in an analogous manner. It is an oil which boils at 150–155° under 0.005 mm. pressure.

What we claim is:
1. An aryloxy acetic acid amide corresponding to the formula

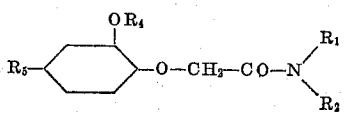

wherein $R_1$ represents a member selected from the group consisting of lower alkyl, lower alkenyl, cyclohexyl, phenyl, benzyl, halogenphenyl, lower alkylphenyl, lower alkoxyphenyl, halogenbenzyl, lower alkylbenzyl and lower alkoxybenzyl, $R_2$ represents a member selected from the group consisting of hydrogen, lower alkyl and lower alkenyl, $R_1$ and $R_2$ taken jointly with the nitrogen atom represent a member selected from the group consisting of the pyrrolidino, piperidino and morpholino radical, $R_4$ represents lower alkyl, and $R_5$ represents a member selected from the group consisting of $R_3$—CO—, $R_3$—CO—$CH_2$—$CH_2$— and $R_3$—CO—CH=CH—, and $R_3$ represents alkyl having at most 7 carbon atoms.

2. 2-methoxy-4-butyryl-phenoxy acetic acid-N.N-diethylamide.
3. 2-methoxy-4-valeryl-phenoxy acetic acid-N.N-diethylamide.
4. 2-methoxy-4-caproyl-phenoxy acetic acid-N.N-diethylamide.
5. 2-methoxy-4-oenanthyl-phenoxy acetic acid-N.N-diethylamide.
6. 2-methoxy-4-caprylyl-phenoxy acetic acid-N.N-diethylamide.
7. 2-methoxy-4-($\Delta^{1'.2'}$-butene-3'-onyl) - phenoxy acetic acid-N.N-diethylamide.
8. 2-methoxy-4-(butane-3'-onyl)-phenoxy acetic acid-N.N-diethylamide.

No references cited.